(12) United States Patent
Rahman

(10) Patent No.: US 11,368,499 B2
(45) Date of Patent: *Jun. 21, 2022

(54) REGISTRATION CONTROL FOR WIRELESS NETWORKS, SUCH AS IMS NETWORKS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/131,519

(22) Filed: Dec. 22, 2020

(65) Prior Publication Data

US 2022/0006844 A1    Jan. 6, 2022

Related U.S. Application Data

(63) Continuation of application No. 16/918,799, filed on Jul. 1, 2020, now Pat. No. 10,911,500.

(51) Int. Cl.
*H04W 4/00* (2018.01)
*H04L 65/1073* (2022.01)
*H04W 60/00* (2009.01)
*H04L 65/10* (2022.01)
*H04L 65/1016* (2022.01)

(52) U.S. Cl.
CPC ...... *H04L 65/1073* (2013.01); *H04L 65/1006* (2013.01); *H04L 65/1016* (2013.01); *H04W 60/00* (2013.01)

(58) Field of Classification Search
USPC ............... 370/218, 352, 328, 329, 330, 331; 709/246; 455/435.1
See application file for complete search history.

(56) References Cited

U.S. PATENT DOCUMENTS

| | | |
|---|---|---|
| 7,693,506 B1 | 4/2010 | Baeck et al. |
| 7,818,002 B2 | 10/2010 | Bajko et al. |
| 7,860,501 B2 | 12/2010 | Wu |
| 8,041,335 B2 | 10/2011 | Khetawat et al. |
| 8,045,984 B2 | 10/2011 | Wu |
| 8,064,907 B2 | 11/2011 | Gallagher et al. |
| 8,107,956 B2 | 1/2012 | Vakil et al. |
| 8,150,393 B2 | 4/2012 | Mayer et al. |
| 8,191,116 B1 | 5/2012 | Gazzard |
| 8,204,502 B2 | 6/2012 | Khetawat et al. |
| 8,351,901 B2 | 1/2013 | Osborn |
| RE44,358 E | 7/2013 | Bajko et al. |
| 9,094,438 B2 | 7/2015 | Shatsky |
| 9,420,607 B1 | 8/2016 | Jain et al. |
| 10,911,500 B1 | 2/2021 | Rahman |
| 2004/0068584 A1* | 4/2004 | Costa-Requena .... H04Q 3/0025 709/246 |
| 2004/0176091 A1 | 9/2004 | Bajko et al. |
| 2006/0114870 A1 | 6/2006 | Buckley et al. |
| 2006/0116125 A1 | 6/2006 | Buckley et al. |
| 2007/0298794 A1 | 12/2007 | Cho |

(Continued)

*Primary Examiner* — David Q Nguyen
(74) *Attorney, Agent, or Firm* — Perkins Coie LLP

(57) ABSTRACT

Systems and methods for dynamically controlling network registrations are disclosed. The method includes replacing a stringent error message with a lenient cause message in responding to a registration request from a user equipment.

20 Claims, 4 Drawing Sheets

(56) References Cited

U.S. PATENT DOCUMENTS

| | | |
|---|---|---|
| 2008/0285543 A1* | 11/2008 | Qiu ........................ H04L 69/40 |
| | | 370/352 |
| 2009/0043724 A1 | 2/2009 | Chesla |
| 2009/0131018 A1 | 5/2009 | Osborn |
| 2009/0262683 A1 | 10/2009 | Khetawat et al. |
| 2009/0262684 A1 | 10/2009 | Khetawat et al. |
| 2009/0264095 A1 | 10/2009 | Khetawat et al. |
| 2009/0264126 A1 | 10/2009 | Khetawat et al. |
| 2009/0270097 A1 | 10/2009 | Gallagher et al. |
| 2009/0270098 A1 | 10/2009 | Gallagher et al. |
| 2009/0270099 A1 | 10/2009 | Gallagher et al. |
| 2010/0041403 A1 | 2/2010 | Khetawat et al. |
| 2010/0167732 A1 | 7/2010 | Vakil et al. |
| 2011/0070887 A1 | 3/2011 | Wu |
| 2012/0094665 A1 | 4/2012 | Soliman et al. |
| 2013/0122868 A1 | 5/2013 | Osborn |
| 2015/0055446 A1 | 2/2015 | Avula et al. |
| 2015/0124584 A1* | 5/2015 | Olrog ...................... H04L 45/28 |
| | | 370/218 |
| 2016/0029228 A1 | 1/2016 | Mufti |
| 2016/0345237 A1 | 11/2016 | Jain et al. |
| 2017/0150468 A1 | 5/2017 | Liao et al. |
| 2017/0339740 A1 | 11/2017 | Abichandani et al. |
| 2020/0159888 A1* | 5/2020 | Ghose ................... G06F 9/3842 |

\* cited by examiner

REGISTRATION CONTROL FOR WIRELESS NETWORKS, SUCH AS IMS NETWORKS

CROSS-REFERENCE TO RELATED APPLICATIONS

This application is a continuation of U.S. patent application Ser. No. 16/918,799, filed Jul. 1, 2020, entitled "REGISTRATION CONTROL FOR WIRELESS NETWORKS, SUCH AS IMS NETWORKS"; the disclosure of which is hereby incorporated herein in its entirety.

BACKGROUND

Rapid growth in computing technology is creating greater demand for data communication. Some mobile devices and applications allow users to watch streaming content in ultra-high definition. Also, increasing number of new devices (e.g., Internet of Things (IoT) devices, and/or wearable devices) or devices that previously provided limited functionalities (e.g., appliances) are now communicating data. However, the amount of available network resources may be limited in supporting the growing demand.

Figure 1:
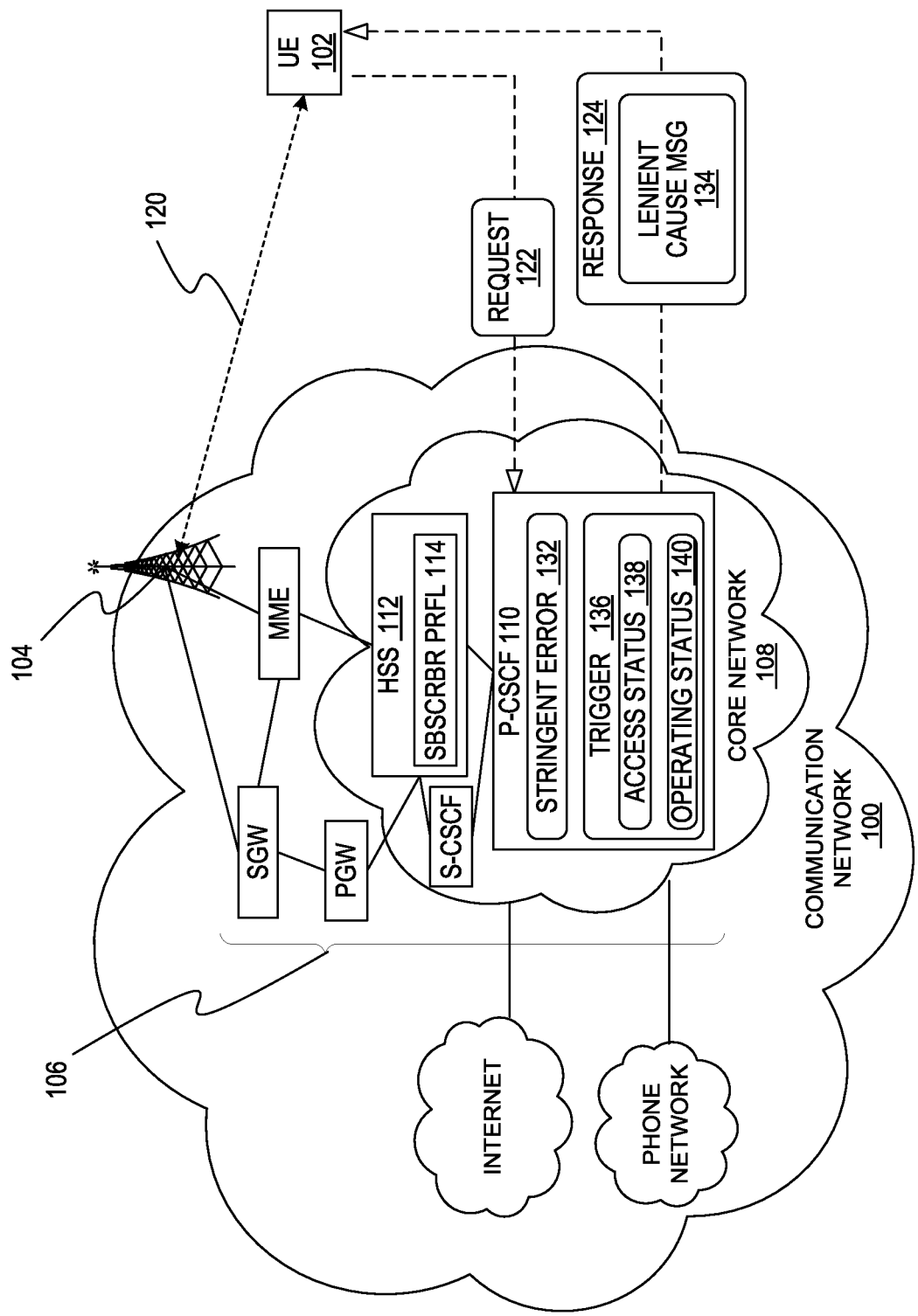
FIG. 1 illustrates a communication network in which some implementations of the present technology can be utilized.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

A mobile communication network facilitates data transfers to and/or from an end-user device (e.g., a mobile device or a User Equipment (UE)). In facilitating such data communications, the end-user device often must register with the mobile communication network or a portion therein (e.g., a core network). To register, the mobile communication network processes a registration request from the end-user device. For example, the mobile communication network determines whether the requesting end-user device is identified as an authorized subscriber according to a subscriber profile (e.g., a subscriber list tracked and managed by a Home Subscriber Server (HSS)). The mobile communication network can provide a response to the end-user device based on the determination results. For example, the mobile communication network and the end-user device can use a Session Initiation Protocol (SIP) to initiate, maintain, and/or terminate real-time sessions. Accordingly, the registration request and the corresponding response can follow the SIP.

As an illustrative example, a roaming UE sends a SIP registration request to the mobile communication network. The requested registration corresponds to a base or minimum level connection, such as for voice communications (e.g., via Voice over Internet Protocol (VoIP), Voice over LTE (VoLTE) and/or Voice over IMS). The core network (e.g., the IP Multimedia Core Network Subsystem (IMS)) receives and processes the request. Whenever the processing provides a non-positive result, such as when the requesting end-user device is not authorized to access the network according to the HSS, the mobile communication network sends a stringent error message (e.g., a 400-level SIP error code) to the end-user device. Accordingly, the mobile communication network blocks or does not provide the requested connection to the end-user device. Further, based on receiving the stringent error message, the end-user device can black-list the mobile communication network for one or more subsequent connections. For example, the UE may identify the network as being "forbidden" after receiving the 400-level SIP error code and not attempt to connect to the forbidden network for future communications for a relatively long time, such as until the UE is reset.

In conventional communication systems/networks, such stringent error messages are sent for all non-positive results. For example, a 400-level SIP error code may be sent to the UE based on network outages that prevent the necessary network components/nodes (e.g., the HSS) to communicate and process the registration information. As a result, the conventional communication systems/networks deny connections to subscriber devices due to error conditions. In response, the subscriber UEs will also black-list the networks due to error conditions. Accordingly, over time (i.e., with increasing occurrences of the error conditions), the conventional networks/systems see a decrease in usage. When such outages occur on the more sophisticated or faster networks (e.g., 4G or 5G networks), the UEs will experience lower performance or slower connections. Since the UEs will remember the negatively-responding networks as being forbidden for lowest-level connections (e.g., voice communications), the UEs will not attempt to connect to such networks for higher-level connections (e.g., data communications, such as for streaming applications, real-time video communications, and/or other high bandwidth communications).

In contrast, implementations of the present technology replace the stringent error messages with lenient cause messages (e.g., 500-level SIP error codes). A mobile communications network can use a network component, such as a Proxy Call Session Control Function (P-CSCF), to override the stringent error message, and the network component sends the lenient cause message to the UE as a replacement. The network component may blindly replace all stringent error messages with the lenient cause messages. Alternatively, the network component can selectively replace the stringent error messages with the lenient cause messages based on a response trigger. For example, the network component can receive and track one or more network operating states (e.g., network-operating status of one or more network nodes/components). The network component can implement the selective replacement when the network operating states indicate a network outage (e.g., HSS outage). Alternatively or additionally, the network component can implement the selective replacement based on confirming a negative value of a network-access status (i.e., indication that the UE is not an authorized subscriber). Accordingly, the implementations of the present technology enable the UEs to subsequently connect to the networks following error-based connection refusals.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementations of the present technology and can be included in more than one implementations. In addition, such phrases do not necessarily refer to the same implementations or different implementations.

Suitable Environment

FIG. 1 illustrates a communication network 100 (also referred to herein as network 100) in accordance with various implementations or embodiments. The communication network 100 can communicatively couple devices including a user equipment (UE) 102. The UE 102 can include wireless and/or mobile end-user devices. Some examples of the UE 102 can include a mobile phone (e.g., a smart phone), a laptop, a wearable device (e.g., a smart watch, augmented-reality (AR) glasses, etc.), an IoT device, and the like.

The network 100 can include access nodes 104 configured to serve as hubs that function as gateways for the network 100. Some examples of the access node 104 can include a Radio Access Network (RAN) Node (e.g., an Evolved-Universal Terrestrial Radio Access Network (E-UTRAN) Node B (eNode B or eNB), a Radio Network Controller (RNCs) in an E-UTRAN, and/or a next generation Node B (gNB)). The access node 104 may also include a base station, a Wireless Fidelity (WiFi) router, a modem, and/or other network gateway devices. The access nodes 104 can be configured to communicate with the UEs 102 according to one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communication technologies.

In general, the network 100 can include multiple cells, with each cell including one or more BSs (macro cell), 5G transceivers (including small cell devices), or a combination of both macro and small cells (HetNets), though many other cell types are possible including cells having one or more femtocells, picocells, IEEE 802.11 access points (WiFi APs), and the like. Depending on the configuration and size, the network 100 can represent and serve various regional areas, for example, one or more rooms, one or more blocks, a city, a state, an entire nation, the whole world, etc.

The network 100 can include network nodes 106 communicatively coupled to the access nodes 104. The network nodes 106 can be configured to process and/or route information to/from the UEs 102 to counterpart communication endpoints (e.g., service providers, content/service servers, and/or other end-user devices). The access nodes 104 can be communicatively coupled (e.g., using a backhaul connection) to backhaul equipment, for example, an operation support subsystem (OSS) server, a radio network controller (RNC), etc. Some examples of the network nodes 106 can include a mobility management entity (MME), a serving gateway (SGW), and/or a package data network (PDN) gateway (PGW). The MME can be a control node for an access network. The MME can control an idle mode UE paging and tagging. The MME can select the serving gateway SGW for the UE 102. The SGW can be a component configured to route and forward user data packets to/from the UEs (e.g., via the access node 104). The SGW can function as a reference for a user plane during handovers for connected a UE to a different connection node. The PGW can include network components configured to provide connectivity between the UEs and external packet data networks. In other words, the PGW can function as an exit/entry point of traffic for the UEs. Additionally or alternatively, the network nodes 106 can include Network Functions (NFs).

The network 100 can include a core network 108 configured to function as a backbone portion of the network 100. For example, the core network 108 can include components (e.g., a set of the network nodes 106) configured to implement wireless communications, such as cellular communication networks and/or wireless fidelity networks. The core network 108 can be connected to different parts of the network 100, such as the Internet and/or telephone networks. Accordingly, the core network 108 can establish/facilitate communication sessions for exchanging data between communication endpoints (e.g., end-user devices and/or service provider servers). The core network 108 can include an IP Multimedia Core Network Subsystem (IMS).

The network 100 may be operated by a service/network provider. End users may sign up as subscribers of the provider and one or more networks thereof. A single provider may operate one or more networks. In some instances, the provider may operate multiple networks corresponding to multiple protocols or access technologies. For example, a single provider may operate a 3G network, a 4G network, a 5G network, a telephone network, an IP-based network, and/or other such networks. Accordingly, a subscribing UE may be able to access one or more of the operating networks, simultaneously and/or separately.

As an illustrative example, the core network 108 can include one or more Proxy-Call Session Control Functions (P-CSCF) 110 and/or one or more Home Subscriber Servers (HSSs) 112. The P-CSCF 110 may include hardware (e.g., circuitry), software, and/or firmware configured to function as a Session Initiation Protocol (SIP) proxy. The P-CSCF can include a Session Border Controller (SBC). The P-CSCF 110 can serve as a first point of contact for the core network 108. Accordingly, the P-CSCF 110 can be configured to facilitate registration of the UE 102 for the core network 108, such as for providing/allowing access to the core network 108.

In registering the UE 102, the network 100 can compare the UE 102 to a subscriber profile 114 (e.g., a list that identifies the authorized subscribers of the core network 108) maintained by the HSS 112. The network 100 can register the UE 102 based on identifying the UE 102 as an authorized subscriber and allow the UE 102 to access the core network 108. Absent such positive/matching result, the network 100 can notify the UE of the result and prevent the UE 102 from accessing the requested core network 108. Details regarding the process following the non-positive result is described further below.

As an illustrative example, a UE may attempt to connect to the network 100 following a power reset and/or other events that initiate the wireless communication functions of the UE. When the UE discovers the network 100, the UE can send a registration request 122 to connect to the core network 108. The registration request 122 can be for initially establishing a base connection 120 between the UE and the core network 108. The base connection 120 can include a communicative coupling/connection for facilitating a type/category of communication having the lowest bandwidth requirement. For example, the base connection 120 can be for establishing voice communications, such as for Voice over LTE (VoLTE) or Voice over IMS connections. The voice communications can be established according to the SIP, which can be used to initiate, control, and/or terminate a communication session and/or a multimedia session.

The network 100 can receive the registration request 122 from the UE 102 via the P-CSCF 110. The registration request 122 can include an identifier (e.g., an International Mobile Subscriber Identity (IMSI) and/or International Mobile Equipment Identity (IMEI) unique to the UE. The network 100 (e.g., via the HSS 112) can compare the UE identifier to the subscriber profile 114 to determine whether or not the requesting UE is an authorized subscriber of the core network 108. The network 100 (e.g., via the P-CSCF 110) can send a registration response 124 to the UE 102 and enable/disable access thereof to the core network 108 according to the determination result.

Conventional communication systems/networks receive and process similar registration requests from UEs. Conventional networks are typically configured to send stringent error messages 132 (e.g., SIP 400-level error messages) when comparison between the identifier of the requesting UE and subscriber list returns a non-positive result. While the non-positive result can indicate that the requesting UE is not an authorized subscriber, the non-positive result can also include silence or an absence of the comparison result, such as due to a network outage and/or other internal error conditions. For example, the conventional networks send the stringent error messages 132 when an HSS in such network is unresponsive.

When the UEs receive the stringent error messages 132, the UEs consider the responding networks as being forbidden. Accordingly, the UEs refrain from attempting to register to the same network. The UEs may avoid the "forbidden" network until the devices are reset (e.g., hardware or configuration reset). Such avoidance may be desirable when the stringent error messages 132 are sent to actual unauthorized subscriber UEs. However, when stringent error messages 132 are sent to subscriber UEs due to outages or error conditions, subscriber UEs will refrain from registering with what should be authorized/usable networks. Further, since the UEs are led to consider the authorized/usable networks as being forbidden for establish base connections (e.g., voice communication connections described above), the UEs will avoid such networks for more complex connections (e.g., data connections, such as for streaming or real-time video communications). Because the avoided networks are typically higher quality/bandwidth networks, such as 4G LTE and/or 5G networks, subscriber users experience decreased performances in conventional networks over time due to the error-based avoidance. Correspondingly, conventional service providers experience over time a decrease in usage of the higher quality networks and an associated increase in network inefficiency due to the erroneously sent stringent error messages 132.

In contrast, the network 100 can replace the stringent error messages 132 with lenient cause messages 134 (e.g., SIP 500-level error codes) in implementations of the present technology. One or more of the components within the network 100 may be configured to blindly replace the stringent error messages 132 with the lenient cause messages 134. For example, the P-CSCF 110 may include logic or other circuitry configured to blindly replace the stringent error messages 132 with the lenient cause messages 134. In other words, the P-CSCF 110 may be configured to send the lenient cause messages 134 regardless of the result of comparing the identifier of the UE 102 to the subscriber profile 114.

Alternatively, one or more of the components within the network may be configured to selectively/conditionally send the lenient cause message 134 as a replacement for the stringent error message 132. For example, the P-CSCF 110 and/or a Serving-CSCF (S-CSCF) can be configured to selectively/conditionally replace the stringent error message 132 with the lenient cause message 134. In other words, the P-CSCF 110 and/or the S-CSCF can be configured to send the lenient cause messages 134 instead of the stringent error message 132 when one or more response triggers 136 (e.g., predetermined threshold conditions) are satisfied. The response triggers 136 may represent error/outage related conditions and/or other conditions outside of positively identifying the requesting UE 102 as an unauthorized user (e.g., positively verifying that the UE identifier is missing from the subscriber profile 114 and/or listed on a blacklist).

The response trigger 136 may correspond to a network-access status 138. The network-access status 138 can include a result of comparing the UE identifier to the subscriber profile 114. Accordingly, the response trigger 136 may be configured to replace the stringent error message 132 with the lenient cause message 134 whenever the network-access status 138 is outside of an unauthorized user determination (e.g., actual indication that the UE identifier is missing from the subscriber profile 114 and/or is found on a blacklist). For example, the P-CSCF 110 may be configured to replace the stringent error message 132 with the lenient cause message 134 without an affirmative indication that the UE is unauthorized (e.g., replacing when the determination result is absent). In other words, the P-CSCF 110 may be configured to send the stringent error message 132 only when the network-access status 138 of the comparison process indicates that the UE is unauthorized; the P-CSCF 110 may be configured to send the lenient cause message 134 under all other comparison process indications.

Additionally or alternatively, the response trigger 136 may correspond to a network-operating status 140. The network-operating status 140 can represent a state of the network 100, the core network 108, and/or one or more components/functions thereof. The network-operating status 140 can indicate whether or not one or more network nodes 106 (e.g., one or more specific/targeted nodes or all nodes) are functioning as desired/intended. For example, the network-operating status 140 can be based on status signals that indicate operating status of the P-CSCF 110, the IMS, the Interrogating-CSCF (I-CSCF), the HSS 112, and/or other functions/nodes. The status signals can be shared/communicated between the nodes and can be obtained at the P-CSCF 110. Any breaks or disconnections in communication of the status signals from sending nodes/functions can be processed by receiving nodes as indications of inoperable or erroneous states of the sending nodes/functions. Accordingly, the response trigger 136 may be configured to replace the stringent error message 132 with the lenient cause message 134 whenever the network-operating status 140 indicates an inoperable or erroneous state of at least one or a specified set of nodes/functions. For example, the P-CSCF 110 may be configured to send the lenient cause message 134 instead of the stringent error message 132 whenever the network-operating status 140 indicates network or component outage. In other words, the P-CSCF 110 may be configured to send the stringent error message 132 only when all of the monitored or specified set of network components are functioning as expected; the P-CSCF 110 may be configured to send the lenient cause message 134 under all other network conditions.

As an illustrative example, the network-operating status 140 can correspond to an internal overload check mechanism for determining different levels of overload. The internal overload check mechanism can determine tiers of overload states (e.g., low/medium/high, tiers 1-5, etc.) according to the real-time performance. When sporadic rejection events are detected as defined by one or more predetermined conditions while overload states are not determined and/or while the overload states are below a predetermined threshold, the network 100 can determine satisfactory network condition (e.g., no component outage). Accordingly, the network 100 can send the stringent error message 132 without the above-described replacement. However, when the sporadic rejection events are detected while the overload states satisfy the predetermined threshold, the network 100 can conclude a network or component outage. Accordingly, the network 100 can send the lenient cause message 134 instead of the stringent error message 132.

By sending the lenient cause message 134 instead of the stringent error message 132, the network 100 can improve or maintain the usage efficiency. In sending the lenient cause message 134, the network 100 can prevent outages or other internal errors from causing the UEs 102 to erroneously log the network 100 as being forbidden. Moreover, the network 100 can selective replace the stringent error message 132 with the lenient cause message 134, thereby avoiding unintended permanent rejection of authorized subscribers caused by outages or internal errors while maintaining the ability to permanently rejecting the unauthorized users.

Control Flow

Figure 2:
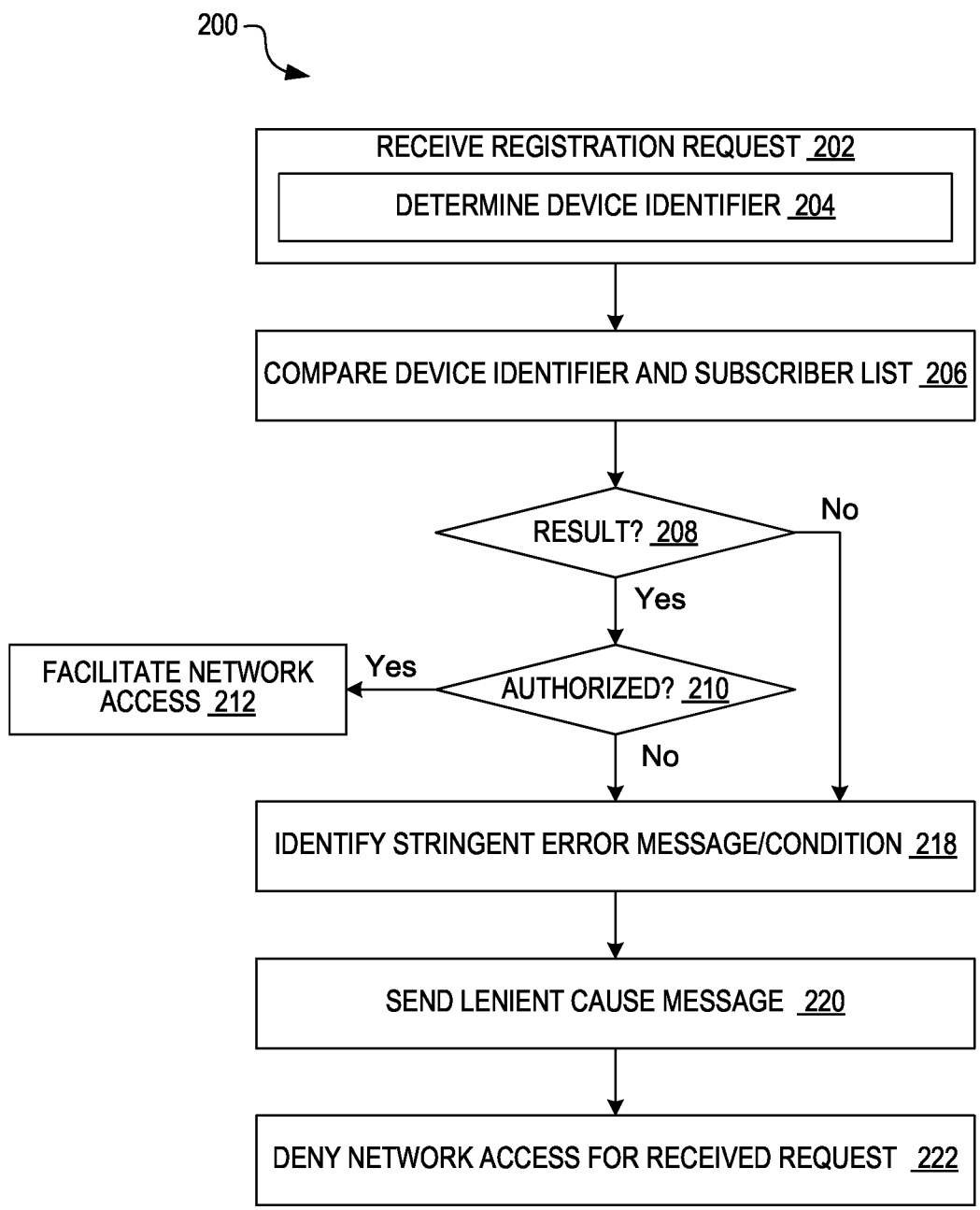
FIG. 2 is a flow diagram illustrating a first example method for controlling UE registration in accordance with one or more implementations of the present technology.

FIG. 2 is a flow diagram illustrating a first example method 200 for controlling UE registration and replacing the stringent error message 132 of FIG. 1 with lenient cause message 134. The method 200 can be for operating the network 100, the core network 108, and/or one or more components therein (e.g., the P-CSCF 110, the HSS 112, the I-CSCF, the S-CSCF, and/or other network nodes).

At block 202, the network 100 can receive a registration request (e.g., the registration request 122 of FIG. 1). The registration request 122 may be a SIP message from the UE 102. The network 100 can receive the registration request 122 from the UE 102 at a network node, such as the P-CSCF 110 and/or the I-CSCF. The registration request 122 may be for establishing the base connection 120, such as for facilitating voice communication functions of the UE 102. For example, the registration request 122 can be for accessing a higher-level communication service (e.g., voice communications and/or messaging services according to 4G communication technology, LTE communication technology, WiFi communication technology, and/or a 5G) communication technology) instead of an available lower-level communication service (e.g., 3G or 2G communication technology). The network 100 can forward the registration request 122 to other network nodes, such as the S-CSCF and/or the HSS 112 for further processing.

At block 204, the network 100 can identify a device identifier (e.g., IMSI and/or IMEI) based on the registration request. The identified device identifier represents the UE 102 requesting registration. At block 206, the network 100 (e.g., at the HSS 112, S-CSCF, and/or other network nodes) can compare the device identifier to the subscriber profile 114. Accordingly, the network 100 can determine whether or not the requesting UE 102 is an authorized subscriber of the network 100 and/or the core network 108. The network 100 (at, e.g., the S-CSCF and/or the HSS 112) may generate the network-access status 138 as a result of the comparison between the device identifier and the subscriber profile 114. Generating the comparison result may include generating the stringent error message 132 (e.g., 400-level SIP message), such as based on detecting an error condition (e.g., when requesting user is not found in the subscriber profile 114) in response to the registration request 122. Subsequently, the network 100 may communicate the comparison result to one or more network nodes, such as the P-CSCF 110, for communicating a response to the UE 102.

At decision block 208, the network 100 can determine whether the comparison result is received or available at a predetermined network node. For example, the P-CSCF 110 may be configured to determine whether the comparison result is received or available following reception of the registration request 122. When the comparison result is available, such as illustrated at decision block 210, the network 100 can determine whether the UE 102 is an authorized subscriber. For example, the P-CSCF 110 examines the comparison result (e.g., the network-access status 138) to determine whether the UE 102 is an authorized subscriber. When the UE 102 is an authorized subscriber, such as illustrated at block 212, the network 100 can facilitate network access. Since one or more network nodes received the positive indication/verification that the UE 102 is an authorized subscriber, the network 100 can implement processes (e.g., predetermined protocol steps) to allow the UE 102 to access the core network 108.

When the UE 102 is not an authorized subscriber and/or when the comparison result is unavailable, such as illustrated at block 218, the network 100 can identify a stringent error message or a corresponding condition. For example, a periphery network node (e.g., an IMS device, such as the P-CSCF 110) may receive the stringent error message 132 along with or included in the network-access status 138. The stringent error message 132 can indicate an upstream processing result identifying the requesting UE 102 as an unauthorized user. Also, one or more network nodes (e.g., the periphery network node, the IMS device, and/or the P-CSCF 110) can identify a stringent error condition based on a timeout event. The one or more network nodes can initiate a timer based on the network 100 receiving the registration request 122. The timeout event can correspond to the timer value exceeding a predetermined response duration before the comparison result is available (e.g., due to network outage or other internal errors) at the one or more network nodes.

At block 220, the network 100 can send the lenient cause message (the lenient cause message 134) to the UE 102. For example, the one or more network nodes (such as the periphery network node, the IMS device, and/or the P-CSCF 110) identifying the stringent error/condition can replace the stringent error message 132 with the lenient cause message 134 (i.e., transmit the lenient cause message 134 instead of the stringent error message 132). The periphery network node can include logic and/or circuitry configured to identify and replace the stringent error message 132 with the lenient cause message 134. The periphery network node can be configured to blindly replace the messages or selectively replace the messages. Details regarding the selective replacement are further described below. Accordingly, the network 100 (e.g., from the periphery network node) can send the lenient cause message 134 to the UE 102 as a response to the registration request 122.

At block 222, the network 100 can deny the UE 102 from accessing the core network 108 for the received request. In other words, the network 100 can prevent the UE 102 from accessing the core network 108 in response to the received request.

Since the lenient cause message 134 may impose less restrictive access/use of the core network 108 in practice (i.e., the stringent error message 132 may cause the UE 102 to disregard the core network 108), the network 100 may enable the UE 102 to access the higher-level communication service at a subsequent time as described above. Accordingly, the network 100 can send the lenient cause message 134 for enabling the UE 102 to access the higher-level communication services at a subsequent time. Thus, based on sending the lenient cause message 134, the network 100 can prevent decrease in the use of higher-level communication and the corresponding efficiency-loss and performance degradation as described above.

Figure 3:
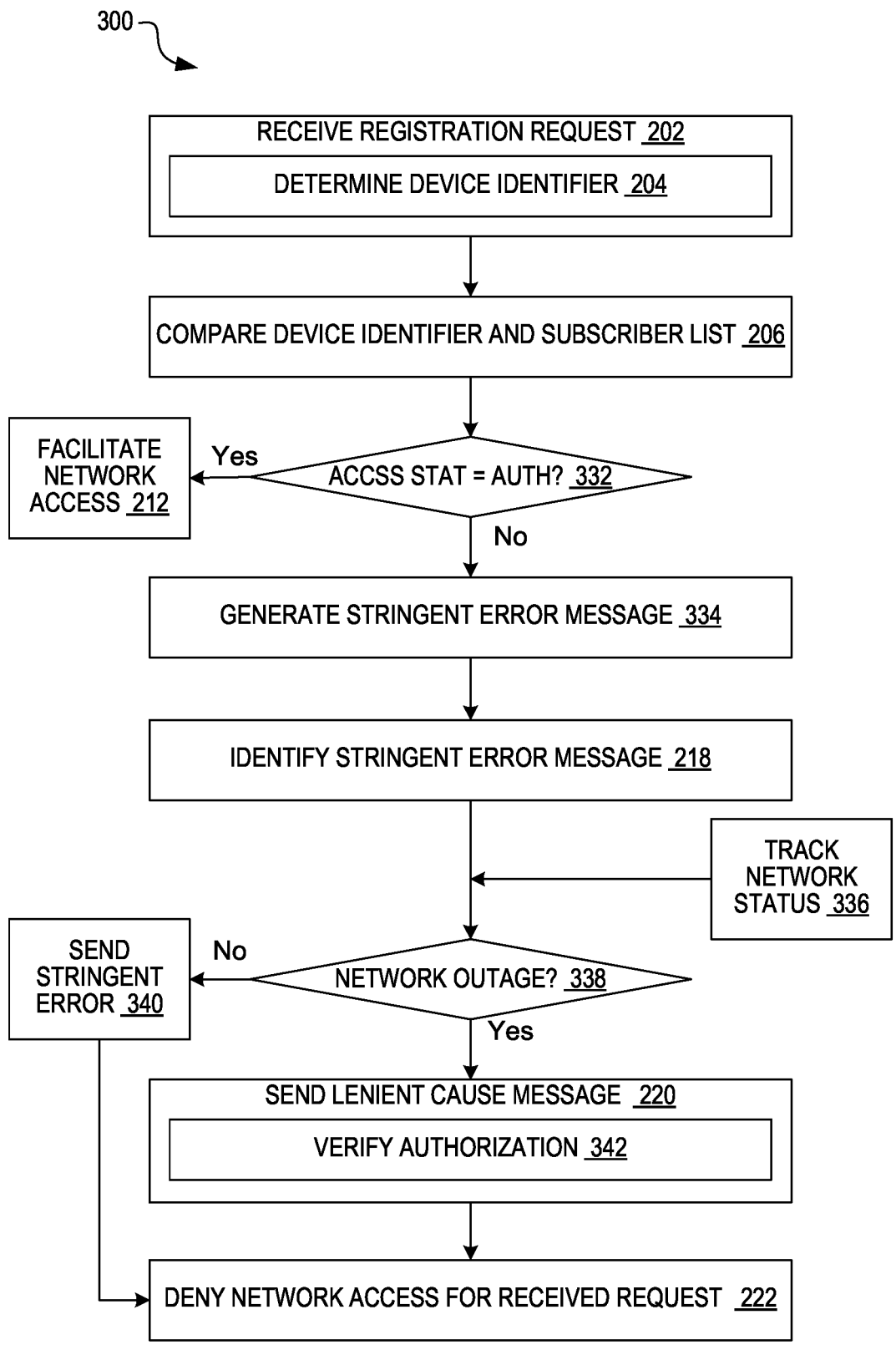
FIG. 3 is a flow diagram illustrating a second example method for controlling UE registration in accordance with one or more implementations of the present technology.

FIG. 3 is a flow diagram illustrating a second example method 300 for controlling UE registration in accordance with one or more implementations of the present technology. The method 300 can be an alternative to the method 200 of FIG. 2. For example, the method 300 can be for selectively replacing the stringent error message 132 of FIG. 1 with the lenient cause message 134 instead of blindly replacing the messages. In other aspects, the method 300 is similar to the method 200. For example, the functionalities of blocks 202, 204, 206, 212, 218, 220, and/or 222 is equivalent to the functionalities described above.

At decision block 332, the network 100 can determine whether the access status (e.g., the network-access status 138) resulting from the comparison indicates that the UE 102 is an authorized subscriber. When the access status indicates that the UE 102 is an authorizes subscriber, such as illustrated at block 212, the network 100 can facilitate network access similarly as described above. The network 100 can implement processes (e.g., predetermined protocol steps) to allow the UE 102 to access the core network 108.

For all other outcomes of the comparison process, including the absence of the comparison result within a predetermine duration from receiving the request, the network 100 can consider replacing the stringent error message 132 with the lenient cause message 134. The consideration process can include generating stringent error message when the access status does not indicate that the UE 102 is an authorized subscriber, such as illustrated at block 334. For example, when the access status is absent or otherwise fails to indicate that the UE 102 is an authorized subscriber, the network 100 may generate the stringent error message 132 using one or more of the upstream network nodes (e.g., the HSS 112, the S-CSCF, and/or the I-CSCF). Alternatively, the network 100 can implement the method 300 without the operations represented by block 334.

At block 218, the network 100 can identify a stringent error message or a corresponding condition as described above. For example, a periphery network node (e.g., an IMS device, such as the P-CSCF 110) may receive the stringent error message 132 along with or included in the network-access status 138. The stringent error message 132 can indicate an upstream processing result identifying the requesting UE 102 as an unauthorized user. Also, one or more network nodes (e.g., the periphery network node, the IMS device, and/or the P-CSCF 110) can identify a stringent error condition based on a timeout event as described above.

At block 336, the network 100 can track network operating status of one or more nodes therein. The network 100 can track the operating status based on communicating status information between a predetermined set of the network nodes 106 (e.g., IMS nodes, I-CSCF, P-CSCF 110, etc.). For example, the P-CSCF 110 can maintain the network-operating status 140 based at least on the operating status message(s) from the HSS 112, the I-CSCF, and/or the S-CSCF. The P-CSCF 110 can set the network-operating status 140 to indicate successful operation when all of the monitored/predetermined nodes report satisfactory operating status. For all other instances, such as when one or more nodes report error and/or are silent regarding the operating status for longer than a predetermined duration, the P-CSCF 110 can set the network-operating status 140 to indicate an error in the network operation (e.g. network outage).

At decision block 338, the network 100 (e.g., at the P-CSCF 110) can check whether the network is experiencing an outage condition or any other internal errors. For example, the P-CSCF 110 can check the maintained value of the network-operating status 140 in response to identifying the stringent error message/condition. When the tracked status does not indicate network outage or other internal errors, the network 100 can send the stringent error message 132 to the UE 102, such as illustrated at block 340. For example, since the network-operating status 140 indicates that all of the tracked network nodes are operating in a satisfactory state, the P-CSCF 110 can determine that the identified stringent error message/condition indicates and/or verifies that the UE 102 is an unauthorized subscriber. In other words, the P-CSCF 110 can identify affirmative indication of the UE 102 as an unauthorized subscriber and not an internal error condition since all monitored network nodes are functioning. Accordingly, the P-CSCF 110 can send the stringent error message 132 to the UE 102. At block 222, the network 100 can deny network access for the UE for the received request as described above.

The network 100 can verify authorization status of the UE 102 in response to identifying the stringent error message/condition and/or the network outage condition (e.g., as a subroutine for blocks 318 and/or 338). For example, a periphery node (e.g., an IMS device, such as the P-CSCF 110) may directly communicate with the HSS 112 according to the network-access status 138 and/or the network-operating status 140. Accordingly, the periphery node can communicate directly with the HSS 112 to compare the UE identity with the subscriber profile 114 and update or redetermine the network-access status 138 associated with the requesting UE 102. The network 100 may send the lenient cause message 134 (block 220) in view of the previous error condition when the direct communication indicates that the requesting UE 102 is an authorized subscriber. Alternatively, the network 100 may disregard the previous error condition and facilitate network access (block 312) when the direct communication indicates that the requesting UE 102 is an authorized subscriber.

When the network 100 detects an outage condition, the network 100 can send the lenient cause message to the UE 102, such as illustrated at block 220. For example, the P-CSCF 110 can determine that the identified stringent error message/condition indicates is caused by an internal error condition since the network-operating status 140 fails to indicate that all of the tracked network nodes are operating in a satisfactory state. In other words, the P-CSCF 110 can determine that the identified stringent error/message is not an affirmative indication that the UE 102 is an unauthorized subscriber. Accordingly, the P-CSCF 110 can replace the stringent error message 132 with the lenient cause message 134. In other words, the P-CSCF 110 and send the lenient cause message 134 to the UE 102 instead of the stringent error message 132 when the operating status indicates an error condition with the one or more nodes.

Overall, as explained above, stringent type error messages (e.g., 4XX SIP error code) are sent to UEs for both mandatory block scenarios (e.g., unauthorized access) and for network outage conditions. Since such errors can be replies to minimum connection requests (e.g. for voice communications), UEs disregard the corresponding network for subsequent connections. As such, in practice, stringent error messages caused by network outage conditions gradually reduce the number of UEs utilizing higher-level networks (e.g., LTE/5G).

To prevent such scenarios, the system described herein focuses on replacing stringent error messages with less restrictive messages (e.g., 5XX SIP codes), which allow or cause UEs to retry connecting to the network at a later time. Replacement logic for this functionality can be implemented via hardware or software at the IMS and/or at the P-CSCF. In some implementations, the network can replace all stringent error codes, while in others, the network can intelligently replace stringent error codes based on (1) cross-referencing with the HSS to determine unauthorized access attempts, and/or (2) detecting network-outage conditions at the IMS/P-CSCF using inter-node communications.
Computer FIG. 4 is a diagrammatic representation of a machine in the example form of a computer system 400 within which a set of instructions, for causing the machine to perform any one or more of the methodologies or modules discussed herein, can be executed.

Figure 4:
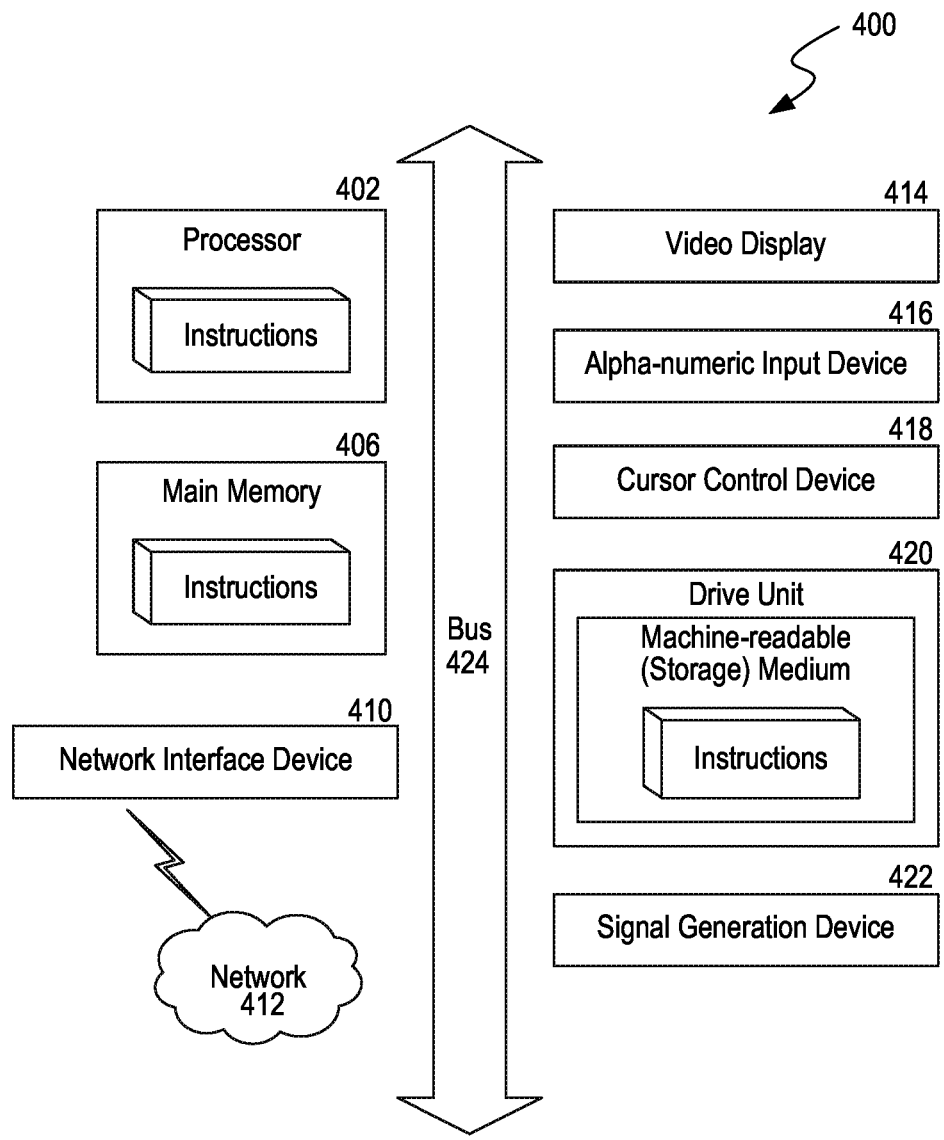
FIG. 4 is a diagrammatic representation of a machine in the example form of a computer system within which a set of instructions, for causing the machine to perform any one or more of the methodologies discussed herein, can be executed.

In the example of FIG. 4, the computer system 400 includes a processor 402, a memory 406, a drive unit 420 (e.g., a machine-readable storage medium, such as a non-volatile memory), and an interface device 410. Various common components (e.g., cache memory) are omitted for illustrative simplicity. The computer system 400 is intended to illustrate a hardware device on which any of the components described in the example of FIGS. 1-4 (and any other components described in this specification) can be implemented. The computer system 400 can be of any applicable known or convenient type. The components of the computer system 400 can be coupled together via a bus or through some other known or convenient device.

This disclosure contemplates the computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 can include one or more computer systems 400; be unitary or distributed; span multiple locations; span multiple machines; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real time or in batch mode one or more steps of one or more methods described or illustrated herein. One or more computer systems 400 can perform at different times or at different locations one or more steps of one or more methods described or illustrated herein, where appropriate.

The processor 402 can be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor 402.

The memory 406 is coupled to the processor by, for example, a bus 424. The memory 406 can include, by way of example but not limitation, random access memory (RAM), such as dynamic RAM (DRAM) and static RAM (SRAM). The memory 406 can be local, remote, or distributed.

The bus 424 also couples the processor 402 to the drive unit 420. The drive unit 420 can include a non-volatile memory that is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 400. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the drive unit 420. It should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 424 also couples the processor 402 to the network interface device 410. The network interface device 410 can include one or more of a modem or network interface. It will be appreciated that a modem or network interface can be considered to be part of the computer system 400. The network interface device 410 can include an analog modem, ISDN modem, cable modem, token ring interface, satellite transmission interface (e.g., "direct PC"), or other interfaces for coupling a computer system to other computer systems.

The system 400 can include one or more input and/or output devices, such as a video display 414 and/or an alpha-numeric input device 416. The I/O devices can include, by way of example but not limitation, a keyboard, a mouse or other pointing device, disk drives, printers, a scanner, and other input and/or output devices, including a display device. The video display 414 can include, by way of example but not limitation, a cathode ray tube (CRT), liquid crystal display (LCD), or some other applicable known or convenient display device. For simplicity, it is assumed that controllers of any devices not depicted in the example of FIG. 4 reside in the interface.

In operation, the computer system 400 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some implementations. The required structure for a variety of these systems will appear from the description below. In addition, the techniques are not described with reference to any particular programming language, and various implementations can thus be implemented using a variety of programming languages.

In alternative implementations, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary implementations to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while implementations have been described in the context of fully functioning computers and computer systems, those skilled in the art will appreciate that the various implementations are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

I claim:

1. At least one tangible computer-readable medium, excluding transitory signals and carrying instructions, which when executed by at least one data processor, executes instructions, the instructions comprising operations to:
   identify a stringent error message at a periphery node within a mobile communication network,
     wherein the stringent error message is based on detection of an error condition in response to a registration request for registration with a core telecommunications network,
     wherein the stringent error message is identified at an IP Multimedia Subsystem (IMS) device, and
     wherein the stringent error message imposes more restrictive access or use of the core telecommunications network than a lenient cause message; and
   send the lenient cause message from the periphery node as a response to the registration request instead of the stringent error message.

2. The computer-readable medium of claim 1, wherein the IMS device includes logic configured to identify and replace the stringent error message.

3. The computer-readable medium of claim 1, further comprising:
   in response to identifying the stringent error message, identifying a network-access status of a mobile device issuing the registration request based on communications with a Home Subscriber Server; and
   sending the lenient cause message from the IMS device when the network-access status indicates the mobile device is unauthorized to access the core network.

4. The computer-readable medium of claim 1, further comprising:
   tracking operating status of one or more nodes within the mobile communication network; and
   sending the lenient cause message from the IMS device when the operating status indicates an error condition with the one or more nodes.

5. The computer-readable medium of claim 1, wherein the IMS device is a Proxy-Call Session Control Function (P-CSCF).

6. The computer-readable medium of claim 1, wherein the registration request is for accessing a higher-level communication service instead of an available lower-level communication service, wherein the higher-level communication service includes voice communications and/or messaging services according to a Fourth-Generation (4G) communication technology, a Long-Term Evolution (LTE) communication technology, a Wireless Fidelity (WiFi) communication technology, or a Fifth-Generation (5G) communication technology.

7. The computer-readable medium of claim 1, wherein the lenient cause message is sent for enabling a mobile device to access higher-level communication service instead of an available lower-level communication service, and at a subsequent time instead of disregarding the core network for the higher-level communication service subsequent to receiving the stringent error message.

8. The computer-readable medium of claim 1, wherein:
   the stringent error message corresponds to a 400-type Session Initiation Protocol (SIP) code; and
   the lenient cause message corresponds to a 500-type SIP code.

9. The computer-readable medium of claim 1, wherein the IMS device is a Proxy-Call Session Control Function (P-CSCF).

10. A system for use in a mobile telecommunications network, the system comprising:
    one or more processors;
    memory coupled to the one or more processors, wherein the memory includes instructions executable by the one or more processors to:
      identify a stringent error message at a periphery node within the mobile telecommunications network,
        wherein the stringent error message is based on detection of an error condition in response to a registration request for registration with a core telecommunications network,
        wherein the stringent error message is identified at an IP Multimedia Subsystem (IMS) device, and
        wherein the stringent error message imposes more restrictive access or use of the core telecommunications network than a lenient message; and
      send the lenient message from the periphery node as a response to the registration request instead of the stringent error message.

11. The system of claim 10, wherein the memory further includes instructions executable by the one or more processors to:
    in response to identifying the stringent error message, identify a network-access status of a mobile device based on communications with a Home Subscriber Server; and
    send the lenient message from the IMS device when the network-access status indicates the mobile device is unauthorized to access the core network.

12. The system of claim 10, wherein the memory further includes instructions executable by the one or more processors to:
    track operating status of one or more nodes within the mobile telecommunications network; and
    send the lenient message from the IMS device when the operating status indicates an error condition with the one or more nodes.

13. The system of claim 10, wherein the IMS device is a Proxy-Call Session Control Function (P-CSCF).

14. The system of claim 10, wherein the registration request is for accessing a higher-level communication service instead of an available lower-level communication service, wherein the higher-level communication service includes voice communications and/or messaging services according to a Fourth-Generation (4G) communication technology, a Long-Term Evolution (LTE) communication technology, a Wireless Fidelity (WiFi) communication technology, or a Fifth-Generation (G) communication technology.

15. The system of claim 10, wherein:
    the stringent error message corresponds to a 400-type Session Initiation Protocol (SIP) code; and
    the lenient message corresponds to a 500-type SIP code.

16. The system of claim 10, wherein the IMS device is a Proxy-Call Session Control Function (P-CSCF).

17. At least one non-transient, computer-readable medium, carrying instructions that, when executed by at least one data processor of a mobile device, performs a method comprising:
    providing a registration request for registering the mobile device with a core network of a wireless communications network;

wherein, in response to the registration request, a stringent error message is identified at an IP Multimedia Subsystem (IMS) device, and
wherein the stringent error message imposes more restrictive access or use of the core network than a lenient message; and
receiving at the mobile device the lenient message from a periphery node as a response to the registration request, wherein the lenient message replaces the stringent error message.

18. The computer-readable medium of claim 17, wherein the method further comprises:
in response to the stringent error message, a network-access status of the mobile device is identified based on communications with a Home Subscriber Server.

19. The computer-readable medium of claim 17, wherein the method further comprises:
operating status of one or more nodes within the mobile communication network are tracked; and
the lenient message is received from the IMS device when the operating status indicates an error condition with the one or more nodes.

20. The computer-readable medium of claim 17, wherein the lenient message permits the mobile device to attempt to later connect to the core network without first resetting the mobile device.

\* \* \* \* \*